US012671988B2

(12) United States Patent
Je et al.

(10) Patent No.: US 12,671,988 B2
(45) Date of Patent: Jun. 30, 2026

(54) METHOD AND DEVICE FOR PROTECTING PRIVACY IN WIRELESS COMMUNICATION SYSTEM

(71) Applicant: Samsung Electronics Co., Ltd., Gyeonggi-do (KR)

(72) Inventors: Donghyun Je, Gyeonggi-do (KR); Dongmyung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 313 days.

(21) Appl. No.: 18/408,029

(22) Filed: Jan. 9, 2024

(65) Prior Publication Data

US 2024/0236667 A1     Jul. 11, 2024

(30) Foreign Application Priority Data

Jan. 9, 2023     (KR) ........................ 10-2023-0002752

(51) Int. Cl.
*H04W 12/06* (2021.01)
*H04W 12/041* (2021.01)
*H04W 12/72* (2021.01)
*H04W 12/75* (2021.01)

(52) U.S. Cl.
CPC ......... *H04W 12/06* (2013.01); *H04W 12/041* (2021.01); *H04W 12/72* (2021.01); *H04W 12/75* (2021.01)

(58) Field of Classification Search
CPC ... H04W 12/06; H04W 12/041; H04W 12/72; H04W 12/75; H04W 8/26; H04W 12/02; H04L 9/3236
USPC ........................................................ 455/410
See application file for complete search history.

(56) References Cited

U.S. PATENT DOCUMENTS

| | | | |
|---|---|---|---|
| 11,076,281 B1 | 7/2021 | Yau et al. | |
| 2008/0070593 A1 | 3/2008 | Altman et al. | |
| 2018/0270666 A1* | 9/2018 | Lee ..................... | H04W 12/069 |
| 2020/0396605 A1 | 12/2020 | Torvinen et al. | |
| 2021/0297855 A1 | 9/2021 | Ben Henda et al. | |
| 2022/0159460 A1* | 5/2022 | Ben Henda ......... | H04W 12/084 |
| 2022/0201487 A1 | 6/2022 | Minokuchi et al. | |

FOREIGN PATENT DOCUMENTS

KR     10-2020-0047697     5/2020

OTHER PUBLICATIONS

Saltzer, Jerome H. et al., "The Protection of Information in Computer Systems", Proceedings of the IEEE, vol. 63, No. 9, pp. 1278-1308, Sep. 1975.

* cited by examiner

*Primary Examiner* — Huy C Ho
(74) *Attorney, Agent, or Firm* — The Farrell Law Firm, P.C.

(57)     ABSTRACT

The present disclosure relates to a 5G communication system or a 6G communication system for supporting higher data rates beyond a 4G communication system such as long term evolution (LTE). A method performed by a first network entity in a wireless communication system includes receiving an authentication acquisition response message including a subscription permanent identifier (SUPI) of a user equipment (UE) from a second network entity, generating a temporary identifier for the UE based on the SUPI, and transmitting an authentication response message including the temporary identifier to a third network entity, wherein the temporary identifier includes a variable filed which is generated as a random variable.

20 Claims, 17 Drawing Sheets

300a

300b

300c

400a 405          410          415

UE          VPLMN          HPLMN

SUPI          SUPI          SUPI
SUCI          SUCI          SUCI
IMSI ⌐        IMSI ⌐        IMSI ⌐
K_AMF ⮐       K_AMF ⮐       K_AMF ⮐

400b 420          425          430

UE          VPLMN          HPLMN

SUPI                        SUPI ⌐
- - - - - - - - - - - - - - - - - - - - -
SUCI          SUCI          SUCI
GUTSI ⌐       GUTSI ⌐       GUTSI ⮜
K_AMF ⮐       K_AMF ⮐       K_AMF ⮐

METHOD AND DEVICE FOR PROTECTING PRIVACY IN WIRELESS COMMUNICATION SYSTEM

CROSS-REFERENCE TO RELATED APPLICATION(S)

This application is based on and claims priority under 35 U.S.C. § 119 to Korean Patent Application No. 10-2023-0002752, which was filed in the Korean Intellectual Property Office on Jan. 9, 2023, the entire content of which is incorporated herein by reference.

BACKGROUND

1. Field

The disclosure relates generally to a wireless communication system, and more particularly, to a method and device for protecting a communication user's privacy in a wireless communication system.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the ¹⁄₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In conventional mobile communication systems, telecommunication companies have full-time access to users' private information. Mobile communication systems only need minimal privileges necessary to process the relevant tasks. However, when performing data transmission in a mobile communication system, private information such as the user's permanent identifier (ID) is not required, although current telecommunication companies may access the user's private information regardless of the type of data. For example, the home public land mobile network (HPLMN) and the visited public land mobile network (VPLMN) may be aware of the UE's subscription permanent ID (SUPI) (in particular, unique information, such as the international mobile subscriber identity (IMSI) contained in the SUPI) in any case.

Therefore, there is a need in the art for a method for providing the user's privacy to the network system based on the principle of the least set of privileges.

SUMMARY

This disclosure has been made to address at least the above-mentioned problems and/or disadvantages and to provide at least the advantages described below.

Accordingly, an aspect of the disclosure is to provide a method and apparatus for preventing unnecessary leakage of private information.

Another aspect of the disclosure is to provide a method and apparatus for preventing leakage of privacy to a third party through security of private information.

In accordance with an aspect of the disclosure, a method performed by a first network entity in a wireless communication system may comprise receiving an authentication acquisition response message including a SUPI of a UE from a second network entity, generating a temporary identifier for the UE based on the SUPI, and transmitting an authentication response message including the temporary identifier to a third network entity.

In accordance with an aspect of the disclosure, a method performed by a second network entity in a wireless communication system may comprise receiving an authentication acquisition request message including a SUCI of a UE from a first network entity, de-concealing the received SUCI to identify a SUPI, generating a temporary identifier for the UE based on the identified SUPI, and transmitting an authentication acquisition response message including the generated temporary identifier to the first network entity.

In accordance with an aspect of the disclosure, a first network entity in a wireless communication system may comprise a transceiver and at least one processor. The at least one processor may be configured to receive an authentication acquisition response message including a SUPI of a UE from a second network entity, generate a temporary identifier for the UE based on the SUPI, and transmit an authentication response message including the generated temporary identifier to a third network entity.

In accordance with an aspect of the disclosure, a second network entity in a wireless communication system may comprise a transceiver and at least one processor. The at least one processor may be configured to receive an authentication acquisition request message including a SUCI of a UE from a first network entity, de-conceal the received SUCI to identify a SUPI, generate a temporary identifier for the UE based on the identified SUPI, and transmit an authentication acquisition response message including the generated temporary identifier to the first network entity.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
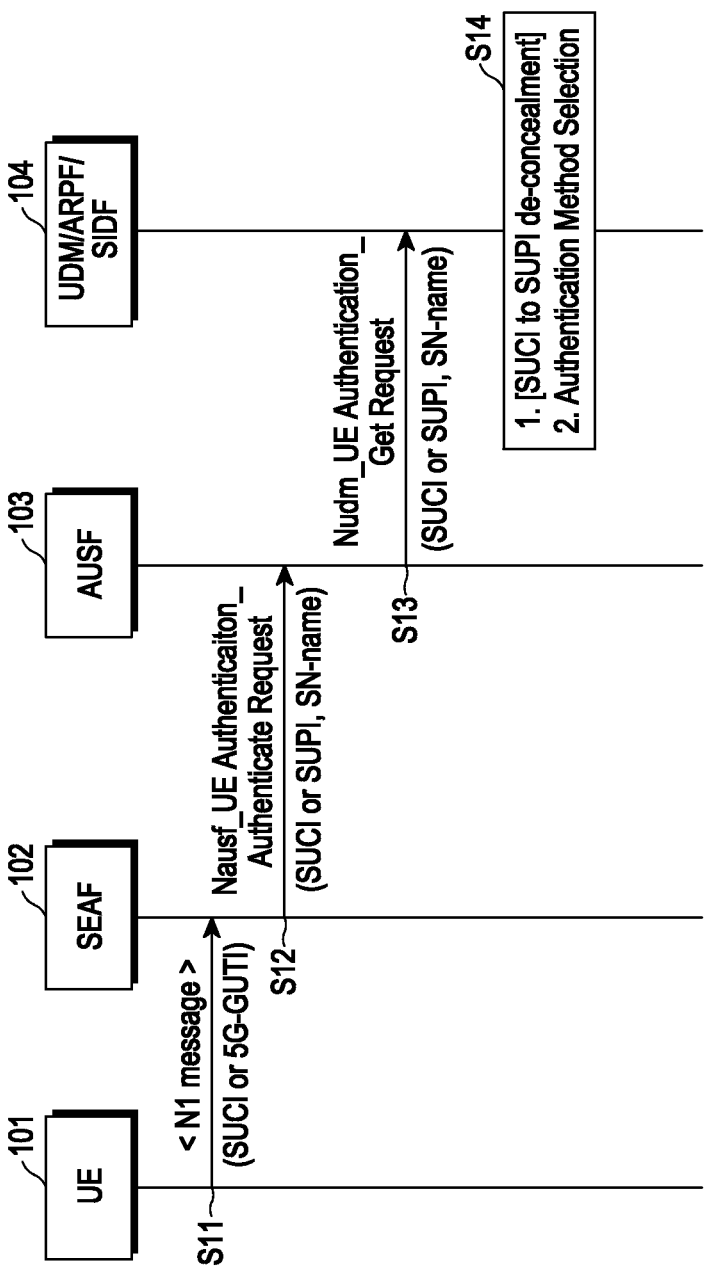
FIG. 1 illustrates an initial authentication procedure of a UE according to an embodiment.

Hereinafter, embodiments of the disclosure are described in detail with reference to the accompanying drawings. The same reference denotations may be used to refer to the same or similar elements throughout the specification and the drawings. Descriptions of well-known functions and constructions may be omitted for the sake of clarity and conciseness.

Similarly, some elements may be exaggerated or schematically shown. The size of each element does not necessarily reflect the actual size of the element. The same reference numeral may be used to refer to the same element throughout the drawings.

Advantages and features of the disclosure, and methods for achieving the same may be understood through the embodiments described in conjunction with the accompanying drawings. However, the disclosure is not limited thereto, and various changes may be made. The embodiments disclosed herein are provided only to inform one of ordinary skilled in the art of the category of the disclosure.

As used herein, the term "unit" indicates a software element or a hardware element such as a field-programmable gate array (FPGA) or an application specific integrated circuit (ASIC). A unit plays a certain role but is not limited to indicating a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the units may be combined into smaller numbers of components and units or further separated into additional components and units. The components and units may be implemented to execute one or more CPUs in a device or secure multimedia card.

The components included in the disclosure are represented in singular or plural forms depending on the embodiment. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

A base station may be an entity allocating a resource to the terminal and may be at least one of a nodeB, an eNode B (eNB), a gNode B (gNB), a radio access unit, a base station controller, or a node on a network. The terminal may include a UE, a mobile station (MS), a cellular phone, a smartphone, a computer, or a multimedia system capable of performing communication functions. The disclosure may also apply to other communication systems with similar technical background or channel forms and may be modified so as not to significantly depart from the scope of the disclosure.

As used herein, terms for identifying access nodes and denoting network entities or network functions (NFs), messages, terms denoting inter-network entity interfaces, and various pieces of identification information are provided as an example for ease of description. Thus, the disclosure is not limited by the terms, and such terms may be replaced with other terms denoting objects with an equivalent technical concept.

For ease of description, some of the terms and names defined in the 3rd generation partnership project long term evolution (3GPP LTE) standards may be used. However, the disclosure is not limited by such terms and names and may be likewise applicable to systems conforming to other standards.

FIG. 1 illustrates an initial authentication procedure of a UE according to an embodiment.

Referring to FIG. 1, a UE (or terminal) 101 may perform an initial authentication procedure with a SEAF entity. The UE 101 may transmit an authentication request message to the SEAF 102 through an N1 message (S11). The authentication request message may include a SUCI or a 5th generation (5G)-globally unique temporary ID (GUTI). The SEAF 102 may transmit a Nausf_UEAuthentication_Authenticate request message to the AUSF entity 103 (S12). The authentication request message may include SUCI or SUPI and a serving network (SN)-name. Upon receiving the authentication request message, the AUSF 103 may compare this message with the name of the expected SN based on the SN-name to determine whether the requested SEAF 102 is qualified to use the name of the requested SN. When it is determined that the SEAF 102 is qualified to use the network, the AUSF 103 may transmit an authentication acquisition request message (e.g., Nausf_UEAuthentication-_Get request) to the UDM/ARPF/SIDF entity 104 (S13). The UDM/ARPF/SIDF may be a set of devices configured with each entity, and may be configured to perform the role of each entity as one device. The authentication acquisition request message may include the SUCI or SUPI and SN-Name. Upon receiving the SUCI, the UDM/ARPF/SIDF 104 may derive the SUPI by de-concealing the SUCI. The UDM/ARPF/SIDF 104 may select an authentication method based on the derived SUPI (S14). In FIG. 1, the SEAF 102 may operate as an entity of the VPLMN, and the AUSF 103 may operate as an entity of the HPLMN. FIG. 1 schematically illustrates a communication procedure between PLMNs for an initial authentication procedure of a UE.

Figure 2:
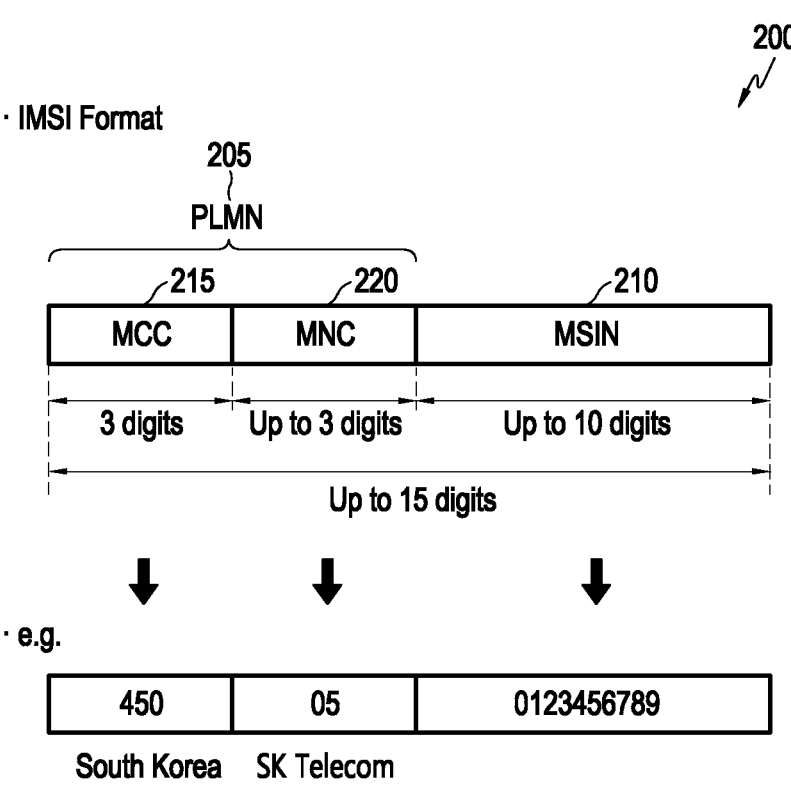
FIG. 2 illustrates an example structure of an IMSI according to an embodiment.

FIG. 2 illustrates an example structure of an IMSI according to an embodiment.

The IMSI of FIG. 2 may be information for specifying the user or the UE included in the SUPI disclosed here.

Referring to FIG. 2, the IMSI 200 includes a PLMN portion 205 and a mobile subscriber identification number (MSIN) 210. The MSIN 210 specifies the user and may appear in up to 10-digit numbers. The PLMN 205 may include a mobile country code (MCC) 215 and a mobile network code (MNC) 220. The MCC 215 is classified for each country, and the MNC 220 is classified for each business operator. The MCC 215 may constitute three-digit numbers, and the MNC may constitute up to three-digit numbers. However, the maximum number of digits of the IMSI 200 may be up to 15 digits. For example, the MCC 215 may be 450 which is a code indicating South Korea, the MNC 220 may be 05 indicating SK telecom, and the MSIN 210 may be expressed using a number obtained by subtracting 0 from 11 digits indicating the phone number of the UE.

Figure 3A:
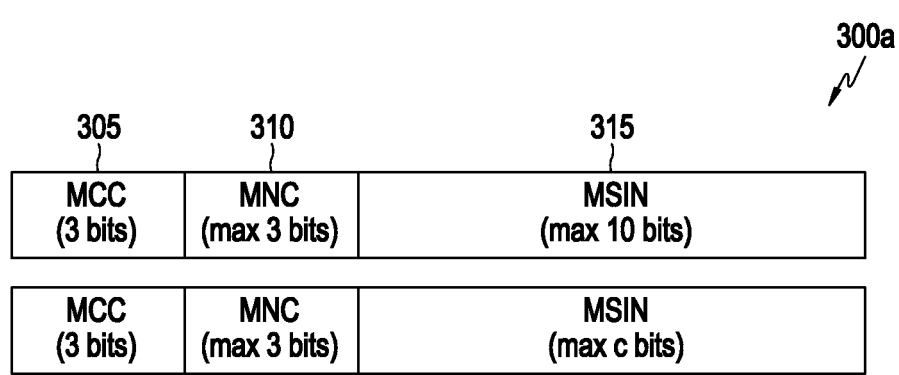
FIG. 3A illustrates a scheme for representing a globally unique temporary subscriber identity (GUTSI) which is a UE's temporary identifier according to an embodiment.

FIG. 3A illustrates a modified structure of IMSI as a structure of GUTSI according to an embodiment. In FIG. 3A, the GUTSI 300a may include an MCC 305, an MNC 310, and an MSIN 315. However, unlike the IMSI in which the number of digits of the MSIN field composed of the user's phone number is configured up to 10 digits, in the GUTSI in FIG. 3A, an arbitrary number (random variable) rather than the user's phone number may be assigned to the MSIN 315 filed for protecting privacy, and the number of digits of the arbitrary number (random variable) may also be configured up to c digits.

Figure 3B:
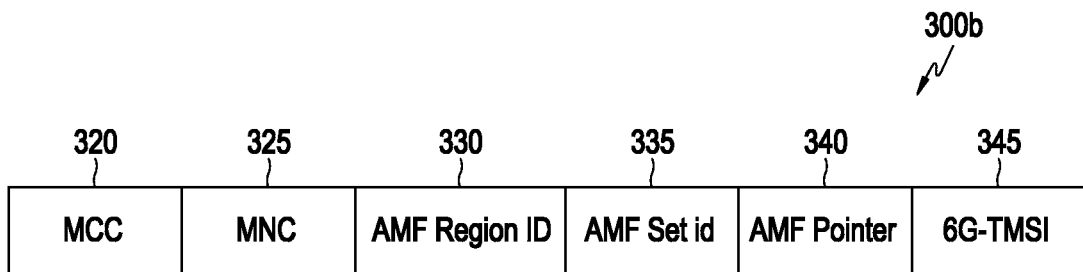
FIG. 3B illustrates a scheme for representing a GUTSI according to an embodiment.

FIG. 3B illustrates a modified structure of the GUTI, according to an embodiment. The GUTSI 300b may include an MCC 320, an MNC 325, an access and mobility management function (AMF) region ID 330, an AMF set ID 335, an AMF pointer 340, and a sixth generation (6G)-temporary mobile subscriber identity (TMSI) 345.

Figure 3C:
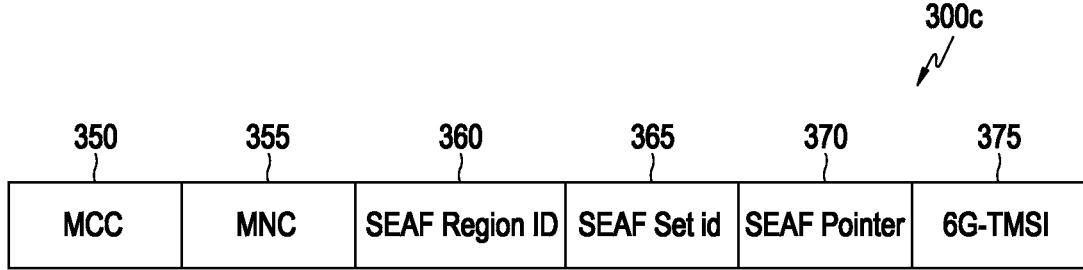
FIG. 3C illustrates a scheme for representing a GUTSI according to an embodiment.

FIG. 3C illustrates a modified structure of the GUTI, according to an embodiment. The GUTSI 300c may include an MCC 350, an MNC 355, a SEAF region ID 360, a SEAF set ID 365, a SEAF pointer 370, and a 6G-TMSI 375. The SEAF region ID 360, the SEAF set ID 365, and the SEAF pointer 370 may perform roles similar to those of the AMF region ID 330, the AMF set ID 335, and the AMF pointer 340. The names of the fields are not limited to the terms indicated, and the fields may be divided according to the roles performed. The AMF region ID 330 and the SEAF region ID 360 may indicate regions. The AMF Set ID 335 and the SEAF Set ID 365 may indicate the AMF SET or the SEAF SET in the AMF area or the SEAF area. The AMF pointer 340 and the SEAF pointer 370 may specify one or more AMFs and SEAFs in the AMF SET or SEAF SET. The 6G-TMSIs 345 and 375 may specify the user or the UE. The 6G-TMSIs 345 and 375 may be generated based on any number or on the hash function. (e.g., SHA-1, SHA2, SHA256, SHA284, SHA512, etc.) The 6G-TMSIs 345 and 375 may be generated by the NF entity.

Figures 4A, 4B:
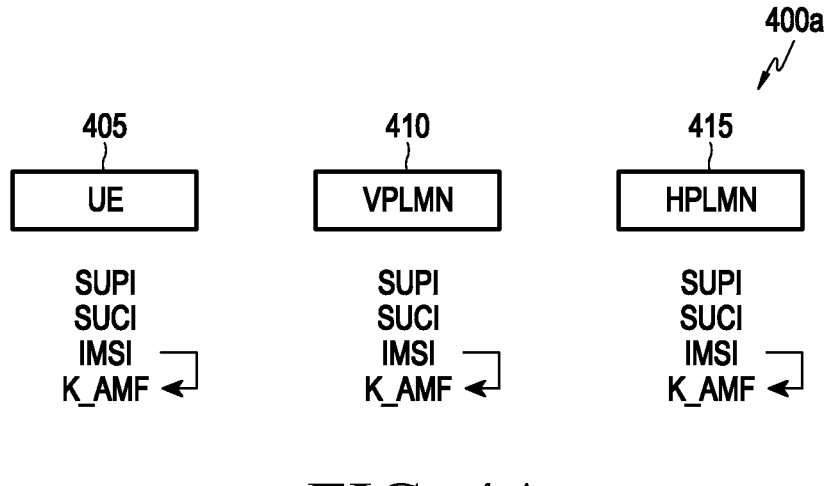
FIG. 4A illustrates a method for generating an authentication key for each entity according to an embodiment.
FIG. 4B illustrates a method for generating an authentication key for each entity according to an embodiment.

FIG. 4A illustrates a method for generating an authentication key for each entity according to an embodiment.

Referring to FIG. 4A, in the case of 400a, the UE 405, the VPLMN 410, and the HPLMN 415 may all use the IMSI to generate the authentication key K_AMF. Since the IMSI includes MSIN information for specifying the user, the UE 405, the VPLMN 410, and the HPLMN 415 all may specify who is the user performing communication.

FIG. 4B illustrates a method for generating an authentication key for each entity according to an embodiment.

Referring to FIG. 4B, in the case of 400*b*, the UE 420, the VPLMN 425, and the HPLMN 430 all use the GUTSI which is temporarily generated and used, to generate the authentication key K_AMF, and thus may not specify who is the user performing communication. The UE 420, VPLMN 425, and HPLMN 430 all communicate because GUTSI, which is temporarily generated and used, is used to generate K_AMF, which is an authentication key. It is not possible to specify who the performing user, but in this case, since the HPLMN 430 generates the GUTSI based on the SUPI, only the HPLMN may identify who is the user performing communication.

Figure 5:
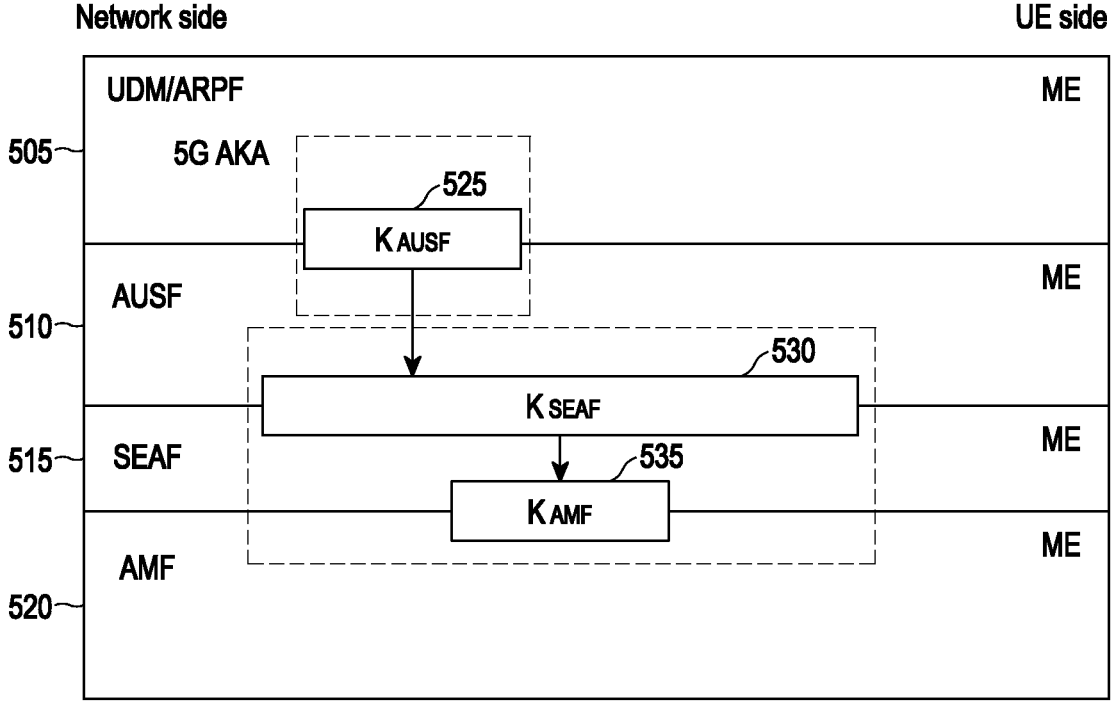
FIG. 5 illustrates a procedure for generating an authentication key according to an embodiment.

FIG. 5 illustrates a procedure for generating an authentication key according to an embodiment.

Referring to FIG. 5, a procedure for generating an authentication key according to an authentication and key agreement (AKA) authentication method at the network end and the UE end may be identified.

When the UDM/ARPF 505 authenticates with the AUSF 510, the K_AUSF key 525 may be generated. The K_SEAF 530 may be generated based on the K_AUSF key 525 generated when the AUSF 510 authenticates with the SEAF 515. The K_AMF key 535 may be generated based on the K_SEAF key 530 generated when the SEAF 515 authenticates with the AMF.

In particular, when deriving the K_AMF key 535 from the K_SEAF key 530, parameters such as FC, P0, L0, P1, and L1 are required. P0 includes an IMSI or an identifier specifying the user such as NAI, GCI, or GLI, so that the SEAF inevitably knows the IMSI to perform the authentication procedure. L0 may include a value obtained by subtracting the octet number of P0 from the length of P0. P1 may include an ABBA parameter. L1 may include a value obtained by subtracting the octet number of P1 from the length of P1.

Described below is a method of performing communication by sharing only essential information without indicating a specific user by using a new identifier rather than using the existing identifier so as to protect the privacy of the user or the UE in the above circumstances.

Figure 6A:
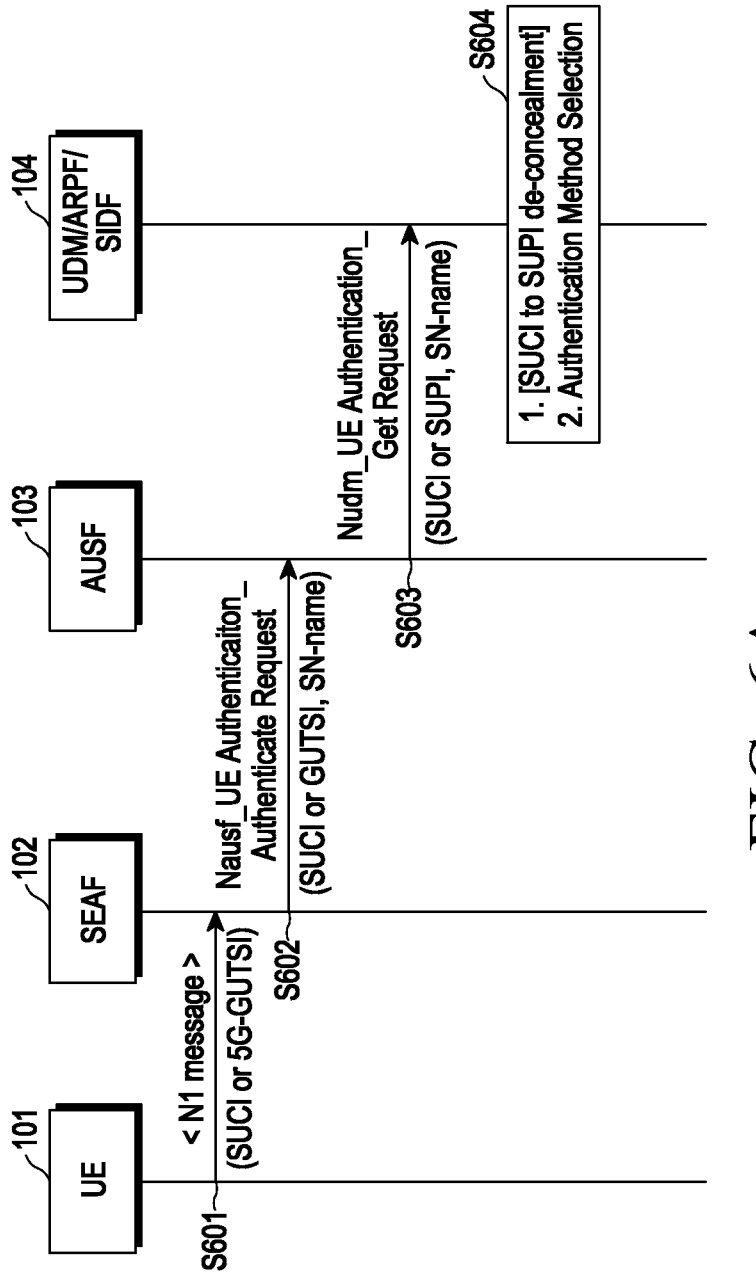
FIG. 6A illustrates a method for initiating an authentication procedure according to an embodiment.

FIG. 6A illustrates a method for initiating an authentication procedure according to an embodiment.

Specifically, FIG. 6A illustrates an embodiment in which the AUSF 103 includes information about the SUPI and the GUTSI.

Referring to FIG. 6A, the UE (or terminal) 101 may perform an initial authentication procedure with an SEAF (or SEAF entity) by transmitting an authentication request message to the SEAF 102 through an N1 message (S601). The authentication request message may include SUCI or GUTSI. The SEAF 102 may transmit an authentication request message (e.g., Nausf_UEAuthentication_Authenticate request) to the AUSF entity 103 (S602). The authentication request message may include SUCI or GUTSI and SN-name. Upon receiving the authentication request message, the AUSF 103 may compare this message with the name of the expected SN based on the SN-name to determine whether the requested SEAF 102 is qualified to use the name of the requested SN. Since the AUSF 103 includes information about the SUPI, the AUSF 103 may identify the SUPI by performing a de-concealing operation from the received SUCI. When it is determined that the SEAF 102 is qualified to use the network, the AUSF 103 may transmit an authentication acquisition request message (e.g., Nausf_U-EAuthentication_Get request) to the UDM/ARPF/SIDF entity (S603). The UDM/ARPF/SIDF may be a set of devices configured with each entity and may be a device configured to perform the role of each entity as one device. The authentication acquisition request message may include SUCI or SUPI and SN-Name. Upon receiving the SUCI, the UDM/SRPF/SIDF 104 may derive the SUPI by de-concealing, in which process the UDM/ARPF/SIDF 104 may select an authentication method based on the derived or received SUPI (S604).

Figure 6B:
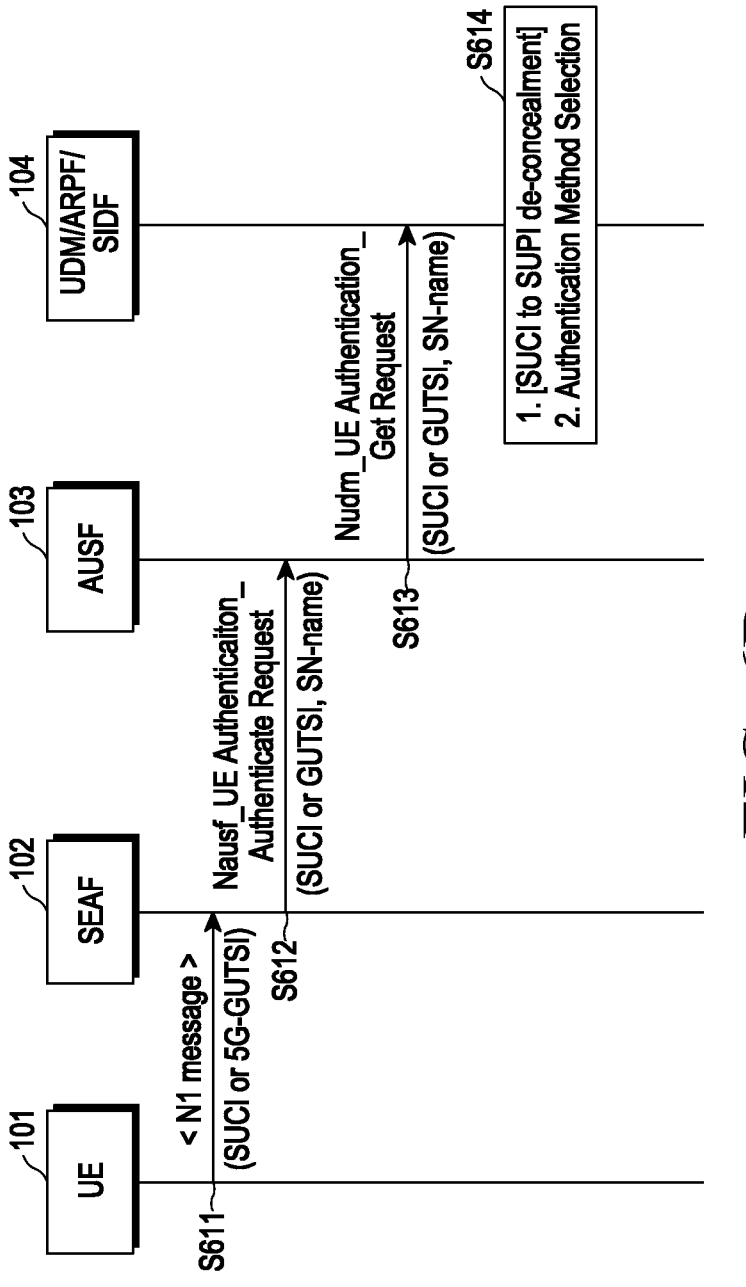
FIG. 6B illustrates a method for initiating an authentication procedure according to an embodiment.

FIG. 6B illustrates a method for initiating an authentication procedure according to an embodiment. Specifically, FIG. 6B illustrates an embodiment in which the AUSF 103 does not know the information about the SUPI.

Referring to FIG. 6B, the UE (or terminal) 101 may perform an initial authentication procedure with an SEAF (or SEAF entity) by transmitting an authentication request message to the SEAF 102 through an N1 message (S611). The authentication request message may include SUCI or GUTSI. The SEAF 102 may transmit an authentication request message (e.g., Nausf_UEAuthentication_Authenticate request) to the AUSF entity 103 (S612). The authentication request message may include SUCI or GUTSI and SN-name. Upon reception, the AUSF entity may compare the authentication request message with the name of the expected SN based on the SN-name to determine whether the requested SEAF 102 is qualified to use the name of the requested SN. When it is determined that the SEAF 102 is qualified to use the network, the AUSF 103 may transmit an authentication acquisition request message (e.g., Nausf_U-EAuthentication_Get request) to the UDM/ARPF/SIDF entity (S613). The UDM/ARPF/SIDF may be a set of devices configured with each entity and may be configured to perform the role of each entity as one device. Since the AUSF 103 does not know the information about the SUPI, the AUSF 103 may include the received information about the SUCI, GUTSI, and SN-name, as-is, in the authentication acquisition request message. When the UDM/ARPF/SIDF 104 receives the SUCI, it may derive the SUPI by de-concealing. The UDM/ARPF/SIDF 104 may select an authentication method based on the derived or received SUPI (S614).

In FIGS. 6A and 6B, since the UE 101 only transmits the concealed SUCI or GUTSI to the SEAF 102, the SEAF 102 may not specify on which UE the corresponding UE is based solely on the received information.

Figure 7A:
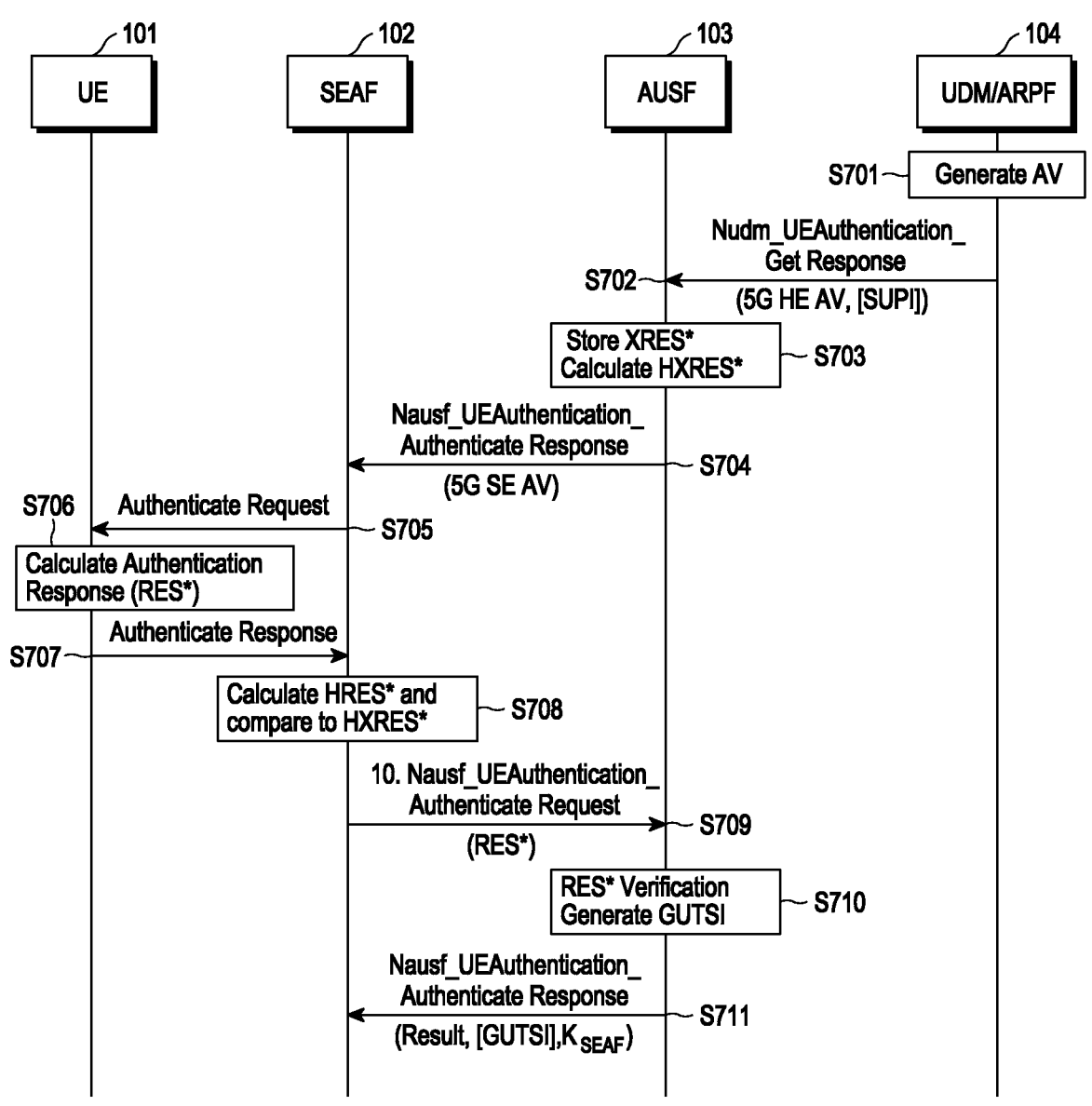
FIG. 7A illustrates a procedure for performing authentication according to an embodiment.

FIG. 7A illustrates a procedure for performing authentication according to an embodiment.

Figure 7B:
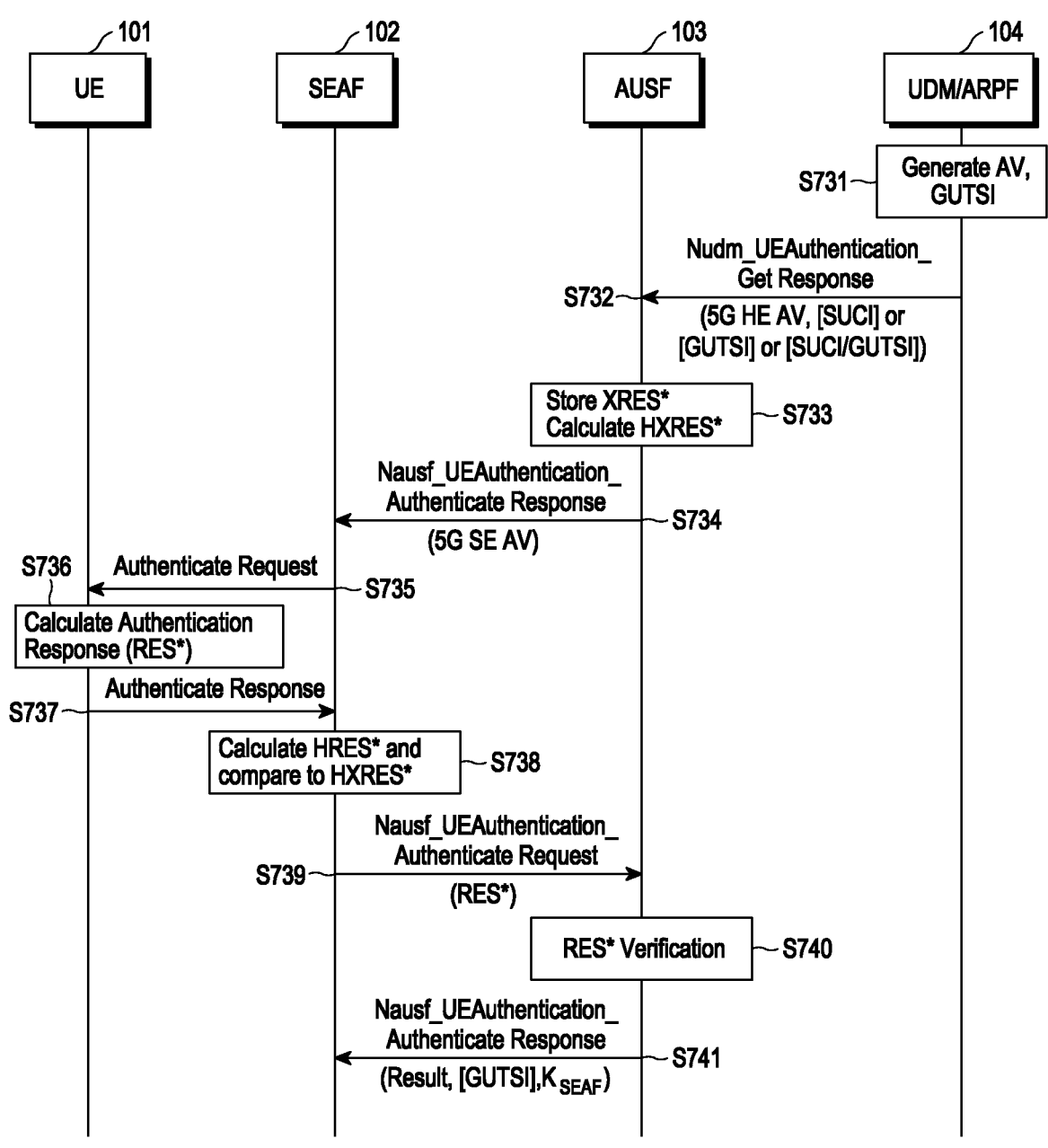
FIG. 7B illustrates a procedure for performing authentication according to an embodiment.

Specifically, FIG. 7A illustrates a 5G AKA) authentication procedure when an AUSF generates a GUTSI, and FIG. 7B illustrates an AKA authentication procedure when a UDM/ARPF generates a GUTSI. According to an embodiment, FIGS. 7A and 7B may illustrate procedures performed according to the authentication methods determined in FIGS. 6A and 6B.

Referring to FIG. 7A, the UDM/ARPF 104 may generate a 5G home environment authentication vector (HEAV), an XRES, and a K_AUSF key for the received authentication acquisition request message (S701). The UDM/ARPF 104 may transmit an authentication acquisition response message (e.g., Nudm_UEAuthentication_Get response) including the generated 5G HE AV, XRES, and KAUSF and the SUPI obtained through de-concealing, to the AUSF 103 (S702).

Upon receiving the authentication acquisition response message, the AUSF 103 may store the received XRES and SUPI and calculate the HXRES from the XRES (S703). Further, K_SEAF may be calculated based on the K_AUSF key. The AUSF 103 may transmit an authentication response message (e.g., Nausf_UEAuthentication_Authenticate Response) including the 5G serving environment (SE) AV (e.g., HXRES) to the SEAF 102 (S704).

The SEAF 102 may transmit an authentication request non-access-stratum (NAS) message to the UE 101 (S705). Upon receiving the authentication request NAS message, the UE 101 may calculate an authentication response (S706) based on the received RES. The UE 101 may transmit the calculated authentication response NAS message to the SEAF 102 (S707). The authentication response NAS message may include RES*. The SEAF 102 may calculate HRES* based on the received RES*. The calculated HRES* may also be compared with HXRES* (S708).

The SEAF 102 may include the received RES* and transmit an authentication request message (e.g., Nausf_UEAuthentication Authenticate request) to the AUSF 103 (S709). The AUSF 103 may verify the received RES* and generate a GUTSI based on the SUPI (S710). The AUSF 103 may transmit an authentication response message including the authentication result to the SEAF 102 in response to the authentication request (S711). The authentication response message may include the generated GUTSI and may be transmitted.

FIG. 7B illustrates a procedure for performing authentication according to an embodiment.

Referring to FIG. 7B, the UDM/ARPF 104 may generate a 5G home environment authentication vector (HEAV), an XRES, and a K_AUSF key for the received authentication acquisition request message. The UDM/ARPF 104 may generate a GUTSI based on the received SUPI or the SUPI obtained through de-concealing (S731). The UDM/ARPF 104 may include the generated 5G HE AV, XRES, KAUSF and SUCI or the generated GUTSI and transmit an authentication acquisition response message (e.g., Nudm_UEAuthentication_Get response) to the AUSF 103 (S732).

Upon receiving the authentication acquisition response message, the AUSF 103 may store the received XRES, SUCI, and GUTSI and calculate the HXRES from the XRES (S733). The K_SEAF may be calculated based on the K_AUSF key. The AUSF 103 may transmit an authentication response message (e.g., Nausf_UEAuthentication_Authenticate Response) including the 5G serving environment (SE) AV (e.g., HXRES) to the SEAF 102 (S734). The K_SEAF key may be calculated using the received GUTSI or 5G-GUTI without using the existing IMSI in P0. In this case, the SEAF may derive an authentication key based on GUTSI even if the user is not yet known.

The SEAF 102 may transmit a NAS message to the UE 101 (S735). Upon receiving the authentication request NAS message, the UE 101 may calculate an authentication response (S736). The UE 101 may calculate RES* based on the received RES and may transmit the calculated authentication response NAS message to the SEAF 102 (S737). The authentication response NAS message may include RES*. The SEAF 102 may calculate HRES* based on the received RES* and may compare the HRES* with HXRES* (S738).

The SEAF 102 may include the received RES* and transmit an authentication request message (e.g., Nausf_UEAuthentication Authenticate request) to the AUSF 103 (S739). The AUSF 103 may verify the received RES* (S740). The AUSF 103 may transmit an authentication response message including the authentication result to the SEAF 102 in response to the authentication request (S741). The authentication response message may include the GUTSI and may be transmitted.

Figure 8A:
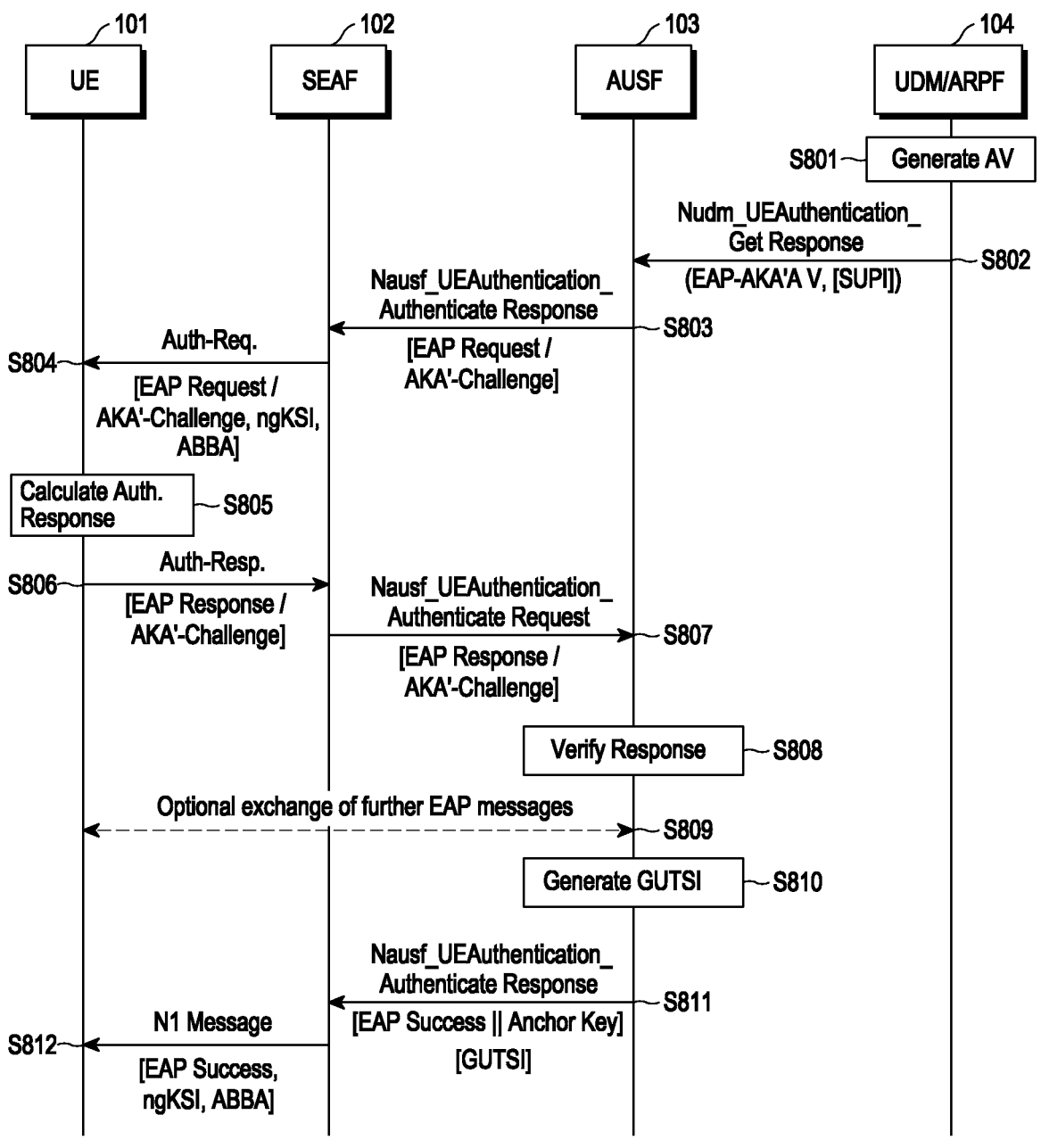
FIG. 8A illustrates a procedure for performing authentication according to an embodiment.

FIG. 8A illustrates a procedure for performing authentication according to an embodiment.

Specifically, FIG. 8A illustrates an extensible authentication protocol (EAP)-AKA authentication procedure when an AUSF generates a GUTSI.

Referring to FIG. 8A, the UDM/ARPF 104 may generate an authentication vector (AV) for the received authentication acquisition request message (S801). The UDM/ARPF 104 may transmit an authentication acquisition response message (e.g., Nudm_UEAuthentication_Get response) including the generated AV and the SUPI obtained through de-concealing, to the AUSF 103 (S802).

Upon receiving the authentication acquisition response message, the AUSF 103 may include the EAP-Request/ AKA'-Challenge message in the authentication response message (e.g., Nausf_UEAuthentication_Authenticate Response) and transmit said message to the SEAF 102 (S803).

The SEAF 102 may transmit an authentication request NAS message including the EAP-Request/AKA'-Challenge message received to the UE 101 (S804). The authentication request NAS message may include ngKSI which is the key set identifier and ABBA parameters. Upon receiving the authentication request NAS message, the UE 101 may calculate an authentication response (S805) by calculating the RES. The UE 101 may transmit the calculated authentication response NAS message to the SEAF 102 (S806). The authentication response NAS message may include an EAP-Response/AKA'-Challenge message. The SEAF 102 may transmit an authentication request message (e.g., Nausf_UEAuthentication_Authenticate request) including the received EAP-Response/AKA'-Challenge message to the AUSF 103 (S807). The AUSF 103 may verify the received message (S808). The AUSF 103 and the UE 101 may selectively exchange additional EAP-Request/AKA'-Notification and EAP-Response/AKA'-Notification (S809). The AUSF 103 may generate a GUTSI based on the SUPI (S810). The AUSF 103 may derive K_SEAF based on K_AUSF. An authentication response message (e.g., Nausf_UEAuthentication_Authenticate Response) including an EAP success may be transmitted to the SEAF 102 in response to the authentication request (S811). The authentication response message may include the generated GUTSI and K_SEAF and may be transmitted. The K_SEAF key may be calculated using the received GUTSI or 5G-GUTI without using the existing IMSI in P0. In this case, the SEAF may derive an authentication key based on GUTSI even if the user is unknown. When the SEAF 102 receives the authentication response message, the SEAF 102 may transmit the N1 message including the EAP success message, the ngKSI, and the ABBA parameter to the UE 101 (S812).

Figure 8B:
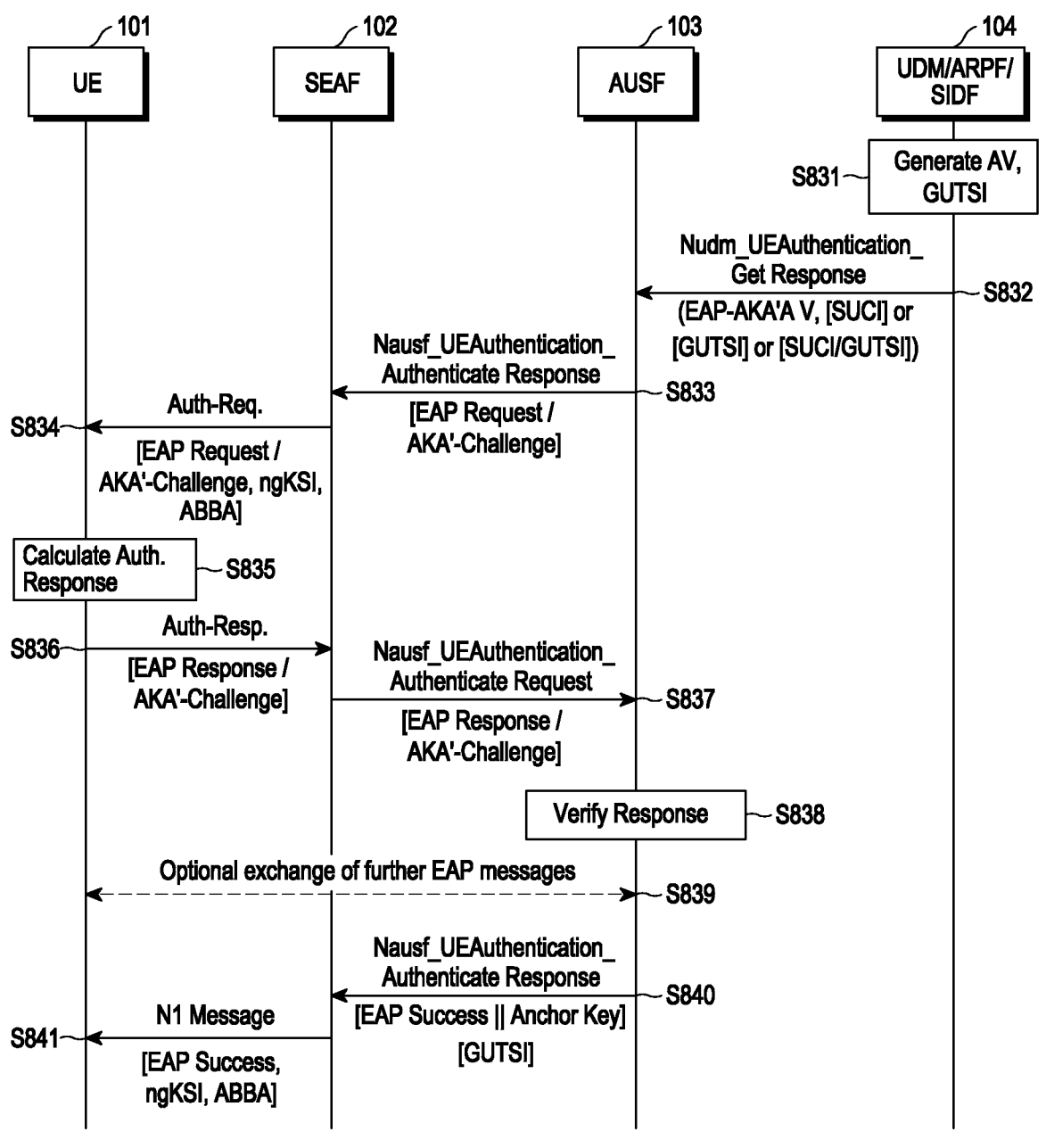
FIG. 8B illustrates a procedure for performing authentication according to an embodiment.

FIG. 8B illustrates a procedure for performing authentication according to an embodiment.

Specifically, FIG. 8B illustrates an EAP-AKA authentication procedure when a UDM/ARPF generates a GUTSI. In FIG. 8B, the UDM/ARPF 104 may generate an authentication vector (AV) for the received authentication acquisition request message. The UDM/ARPF 104 may generate a GUTSI based on the received SUPI or the SUPI obtained through de-concealing (S831). The UDM/ARPF 104 may transmit an authentication acquisition response message (e.g., Nudm_UEAuthentication_Get response) including the generated AV and SUCI or the generated GUTSI, to the AUSF 103 (S832).

Upon receiving the authentication acquisition response message, the AUSF 103 may include the EAP-Request/ AKA'-Challenge message in the authentication response message (e.g., Nausf_UEAuthentication_Authenticate Response) and transmit this message to the SEAF 102 (S833).

The SEAF 102 may transmit an authentication request NAS message including the EAP-Request/AKA'-Challenge message received to the UE 101 (S834). The authentication request NAS message may include ngKSI which is the key set identifier and ABBA parameters. Upon receiving the authentication request NAS message, the UE 101 may calculate an authentication response (S835). The UE 101 may transmit the calculated authentication response NAS message to the SEAF 102 (S836). The authentication response NAS message may include an EAP-Response/ AKA'-Challenge message. The SEAF 102 may transmit an authentication request message (e.g., Nausf_UEAuthentication_Authenticate request) including the received EAP-Response/AKA'-Challenge message to the AUSF 103 (S837). The AUSF 103 may verify the received message (S838). The AUSF 103 and the UE 101 may selectively exchange additional EAP-Request/AKA'-Notification and EAP-Response/AKA'-Notification (S839). The AUSF 103 may derive K_SEAF based on K_AUSF. When calculating the K_SEAF key, it may be calculated using the received GUTSI or 5G-GUTI without using the existing IMSI in P0. In this case, the SEAF may derive an authentication key based on GUTSI even if the user is unknown. An authentication response message (e.g., Nausf_UEAuthentication_ Authenticate Response) including the received GUTSI and the EAP success may be transmitted to the SEAF 102 in response to the authentication request (S840). The authentication response message may include the generated GUTSI and K_SEAF and may be transmitted. When the SEAF 102 receives the authentication response message, the SEAF 102 may transmit the N1 message including the EAP success message, the ngKSI, and the ABBA parameter to the UE 101 (S841).

Figure 9:
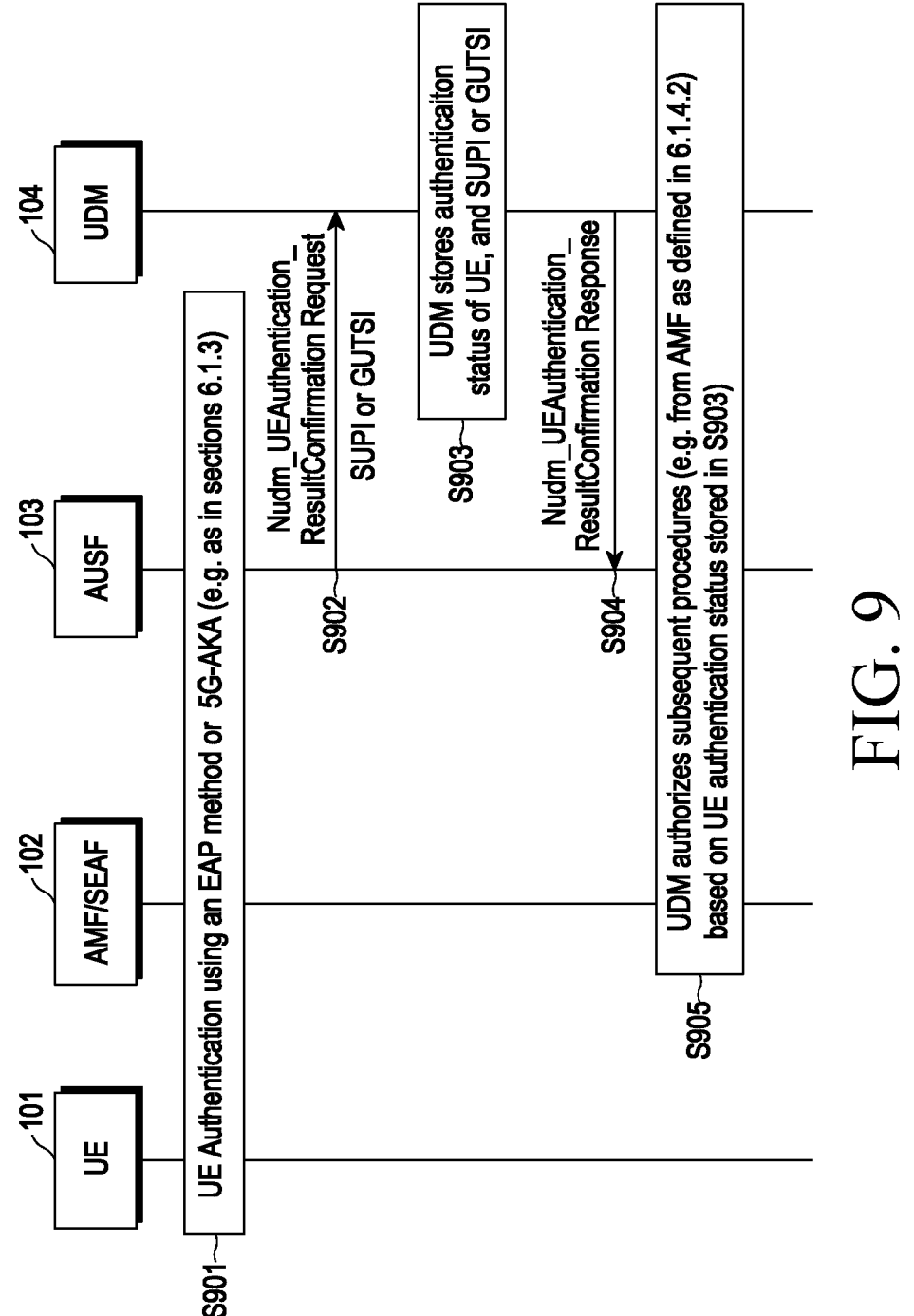
FIG. 9 illustrates a procedure for confirming interaction authentication according to an embodiment.

FIG. 9 illustrates a procedure for confirming interaction authentication according to an embodiment.

In FIG. 9, the UE, SEAF, AUSF, and UDM may be the same devices as the UE, SEAF, AUSF, and UDM, respectively, disclosed in FIGS. 1 to 8B.

FIG. 9 illustrates a procedure performed after performing the AKA authentication procedure according to an embodiment.

Referring to FIG. 9, the UE 101, the SEAF (AMF) 102, and the AUSF 103 may perform EAP authentication or AKA authentication according to the procedures of FIGS. 7A to 8B (S901). When the authentication is completed, the AUSF 103 may transmit an authentication result confirmation request message (e.g., Nudm_UEAuthentication_Result-Confirmation Request) to the UDM 104 (S902). The authentication result confirmation request message may include the GUTSI or SUPI received or generated by the AUSF 103. The result confirmation request message may further include an authentication timestamp, an authentication method type, and an SN-name. The SUPI may be included when the AUSF 103 has authority over SUPI management. The GUTSI may be included if the SUPI is not included. The UDM 104 may store the authentication state of the UE 101 (S903). The UDM 104 may store the received GUTSI, SUPI, authentication timestamp, and SN-name. The UDM 104 may transmit an authentication result confirmation response message (Nudm_UEAuthentication_ResultConfirmation Response) to the AUSF 103 (S904). When the authentication procedure is completed, the SEAF 102, the AUSF 103, and the UDM 104 may perform a subsequent procedure related to the UE based on the authentication state (S905).

Figure 10:
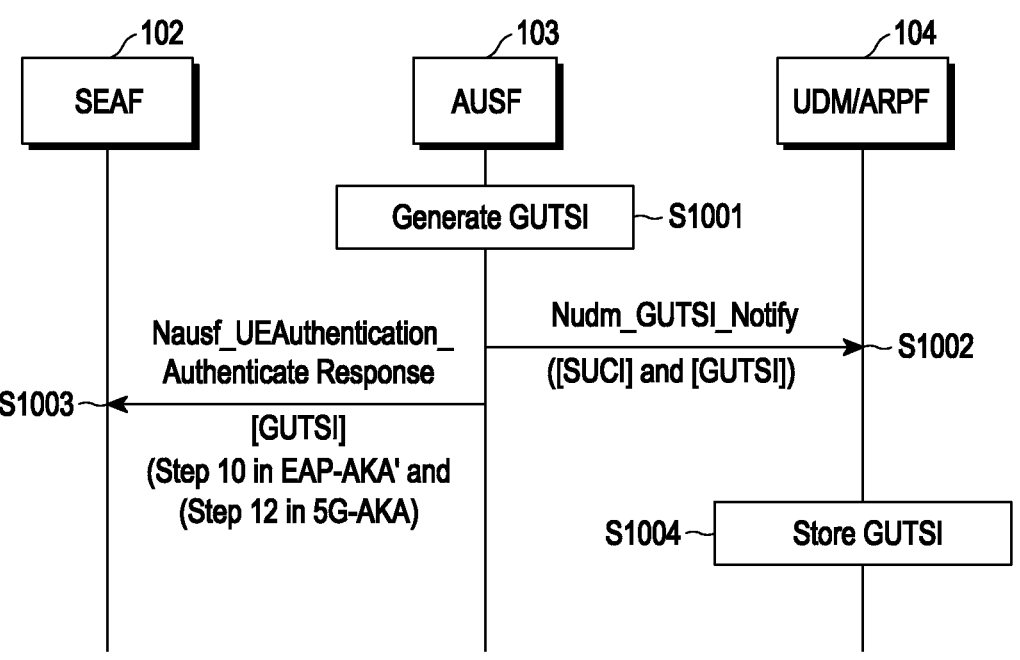
FIG. 10 illustrates a procedure for generating or updating a GUTSI according to an embodiment.

FIG. 10 illustrates a procedure for generating or updating a GUTSI according to an embodiment.

The embodiment illustrated in FIG. 10 may be applied when GUTSI is not included in the authentication acquisition response message as shown in FIGS. 7A and 8A.

Referring to FIG. 10, the AUSF 103 may generate a GUTSI based on the SUPI (S1001). The AUSF 103 may transmit a notification message for transmitting the generated GUTSI to the UDM/ARPF 104 (S1002). The notification message may further include SUCI. The AUSF 103 may include the GUTSI generated when transmitting the authentication response message to the SEAF 102 (S1003). The UDM/ARPF 104 receiving the message including the GUTSI may store the received GUTSI (S1004). If there is a previously stored GUTSI, this GUTSI may be updated with the newly received GUTSI.

Figure 11:
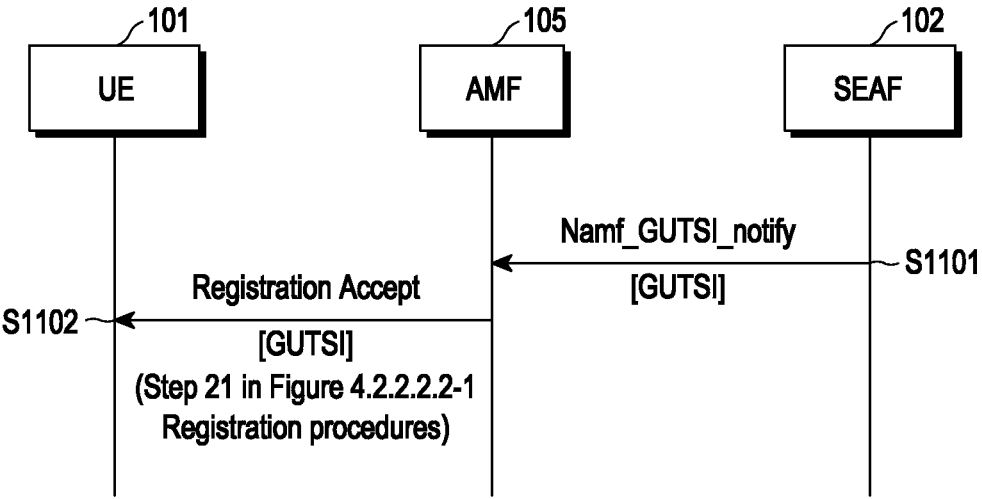
FIG. 11 illustrates a procedure for notifying a UE of a GUTSI according to an embodiment.

FIG. 11 illustrates a procedure for notifying a UE of a GUTSI according to an embodiment.

Referring to FIG. 11, the SEAF 102 receiving the GUTSI through FIGS. 6A to 10 may transmit a notification message including the GUTSI to the AMF 105 included in the same core (S1101). The AMF 105 may include the received GUTSI in the registration response message and transmit the same in a registration accept message to the UE 101 (S1102).

Figure 12:
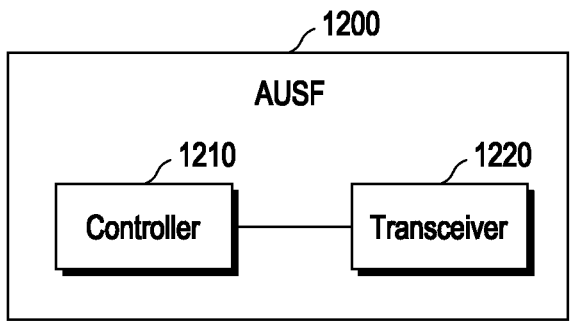
FIG. 12 illustrates a configuration of an authentication server function (AUSF) entity according to an embodiment.

FIG. 12 illustrates a configuration of an AUSF entity according to an embodiment.

The AUSF entity 1200 may include a controller (or processor) 1210 for controlling the overall operation of the AUSF 1200, a transceiver 1220 including a transmitter and a receiver, and memory (not shown). Without limited thereto, the AUSF may include fewer than or additional components to those shown in FIG. 12. It may be understood that the AUSF performs the operation of the HPLMN.

The transceiver 1220 may transmit/receive signals to/from at least one of other devices (or entities) or the UE. The signals transmitted/received with at least one of the other devices (or entities) or the UE may include control information and data. The controller 1210 may control the AUSF 1200 to perform any one of the above-described embodiments. The controller 1210 and the transceiver 1220 are not necessarily implemented in separate modules but rather as a single component, e.g., a single chip. The controller 1210 and the transceiver 1220 may be electrically connected. The controller 1210 may be an application processor (AP), a communication processor (CP), a circuit, an application-specific circuit, or at least one processor.

Figure 13:
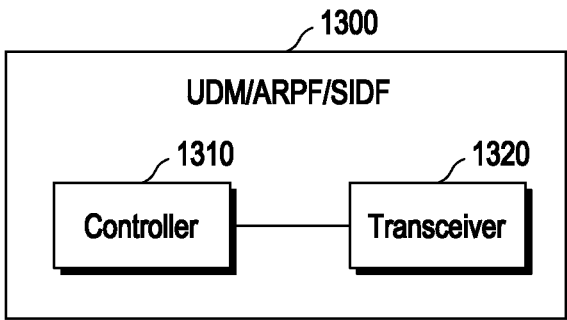
FIG. 13 illustrates a configuration of a unified data manager (UDM)/authentication credential repository processing function (ARPF)/subscription identifier exposing function (SIDF) entity according to an embodiment.

FIG. 13 illustrates a configuration of a UDM/ARPF/SIDF entity according to an embodiment.

The UDM/ARPF/SIDF entity may include a controller (or processor) 1310 for controlling the overall operation of the UDM/ARPF/SIDF 1300, a transceiver 1320 including a transmitter and a receiver, and memory. The UDM/ARPF/ SIDF may include fewer than or additional components to those shown in FIG. 13. The UDM/ARPF/SIDF may be configured as different devices, and one device may be configured to perform the operation of each entity.

The transceiver 1320 may transmit/receive signals to/from at least one of other devices (or entities) or the UE. The signals transmitted/received with at least one of the other devices (or entities) or the UE may include control information and data.

The controller 1310 may control the UDM/ARPF/SIDF 1300 to perform any one of the above-described embodiments. Meanwhile, the controller 1310 and the transceiver 1320 are not necessarily implemented in separate modules but rather as a single component, e.g., a single chip. The controller 1310 and the transceiver 1320 may be electrically connected. The controller 1310 may be an AP, a communication processor (CP), a circuit, an application-specific circuit, or at least one processor.

Figure 14:
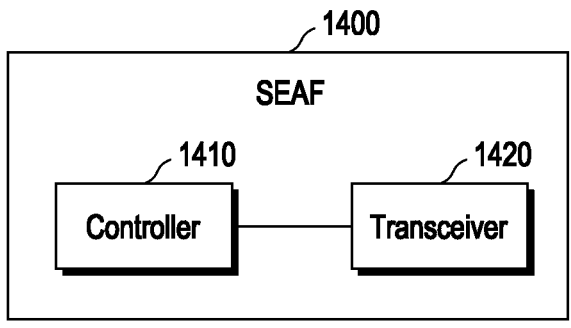
FIG. 14 illustrates a configuration of a security anchor function (SEAF) entity according to an embodiment.

FIG. 14 illustrates a configuration of an SEAF entity according to an embodiment.

The SEAF entity 1400 may include a controller (or processor) 1410 for controlling the overall operation of the SEAF 1400, a transceiver 1420 including a transmitter and a receiver, and memory. The SEAF may include fewer than or additional components to those shown in FIG. 14.

The transceiver 1420 may transmit/receive signals to/from at least one of other devices (or entities) or the UE. The signals transmitted/received with at least one of the other devices (or entities) or the UE may include control information and data.

The controller 1410 may control the SEAF 1400 to perform any one of the embodiments described herein. The controller 1410 and the transceiver 1420 are not necessarily implemented in separate modules but rather as a single component, e.g., a single chip. The controller 1410 and the transceiver 1420 may be electrically connected. The controller 1410 may be an AP, a communication processor (CP), a circuit, an application-specific circuit, or at least one processor.

Figure 15:
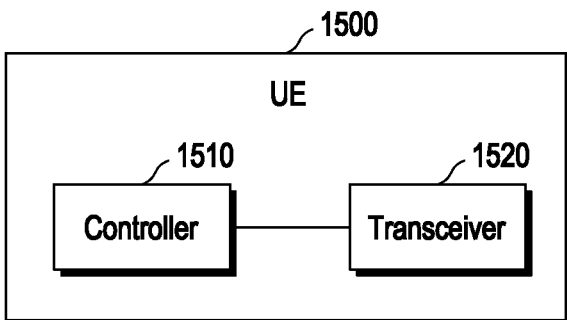
FIG. 15 illustrates a configuration of a UE according to an embodiment.

FIG. 15 illustrates a configuration of a UE according to an embodiment.

The UE (or terminal) 1500 may include a controller (or processor) 1510 for controlling the overall operation of the UE 1500, a transceiver 1520 including a transmitter and a receiver, and memory. The transceiver 1520 may transmit/receive signals to/from other devices (or entities). The signals transmitted/received with at least one of the other devices (or entities) may include control information and data.

The controller 1510 may control the UE 1500 to perform any one of the above-described embodiments. The controller 1510 and the transceiver 1520 are not necessarily implemented in separate modules but rather as a single component, e.g., a single chip. The controller 1510 and the transceiver 1520 may be electrically connected. The controller 1510 may be an AP, a CP, a circuit, an application-specific circuit, or at least one processor.

Figure 16:
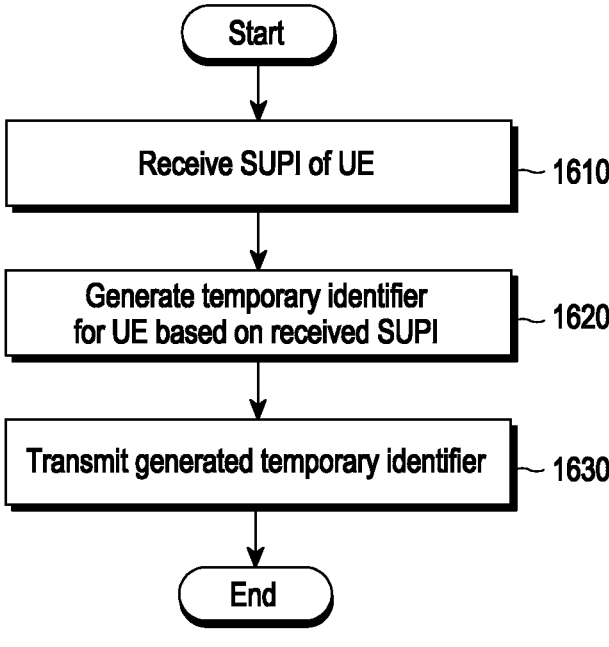
FIG. 16 illustrates a method by a first network entity according to an embodiment.

FIG. 16 illustrates a method by a first network entity according to an embodiment.

In FIG. 16, in a method performed by a first network entity in a wireless communication system, a SUPI of the UE may be received from a second network entity (S1610). In an embodiment, the first network entity may receive, from the second network entity, an authentication acquisition response message including the SUPI of the UE.

The first network entity may generate a temporary identifier for the UE based on the received SUPI (S1620).

The first network entity may transmit the generated temporary identifier to the third network entity (S1630). In an embodiment, the first network entity may transmit, to the third network entity, an authentication response message including the temporary identifier.

The first network entity may be an AUSF entity, the second network entity may be a UDM entity, an ARPF entity, or an SIDF entity, and the third network entity may be a SEAF entity or an AMF.

The temporary identifier may include an MCC field, an MNC field, and a variable field. The variable field may be generated by a hash function or may be generated as an arbitrary variable, and the variable field may be configured to have a predetermined number of digits.

The temporary identifier may include at least one field among the region identifier for the network entity, the set identifier for the network entity, the network entity identifier, and the variable field. The variable field may be generated by a hash function or may be generated as an arbitrary variable. The network entity may be an AMF entity or an SEAF entity.

The method may further include generating authentication information (authentication vector) based on the temporary identifier, performing authentication based on the temporary identifier, generating an authentication key based on the temporary identifier and the authentication information, and transmitting the generated authentication key to the third network entity.

Figure 17:
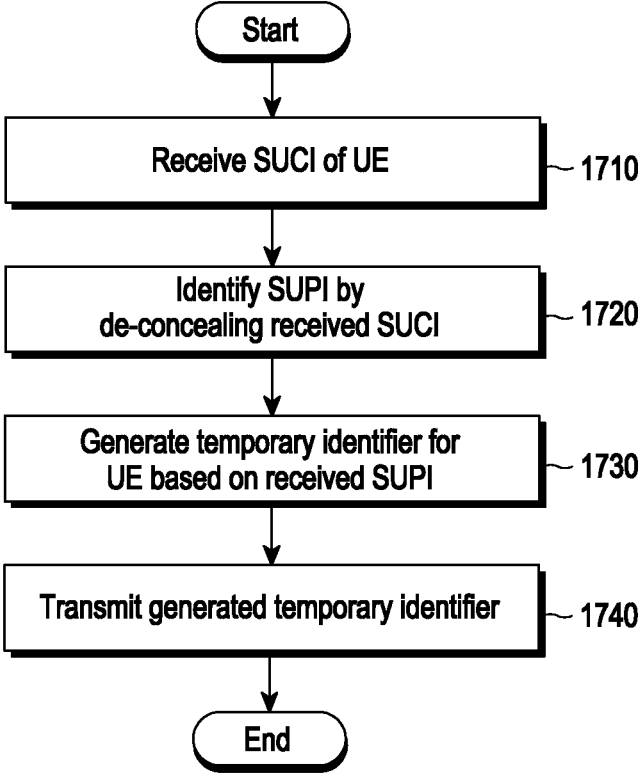
FIG. 17 illustrates a method by a second network entity according to an embodiment.

FIG. 17 illustrates a method by a second network entity according to an embodiment.

In FIG. 17, the SUCI of UE may be received from the first network entity (S1710). In an embodiment, the second network entity may receive, from a first network entity, an authentication acquisition request message including the SUCI of the UE.

The second network entity may identify the SUPI by de-concealing the received SUCI (S1720).

The second network entity may generate a temporary identifier for the UE based on the identified SUPI (S1730).

The second network entity may transmit the generated temporary identifier to the first network entity (S1740). In an embodiment, the second network entity may transmit to the first network entity, an authentication acquisition response message including the temporary identifier.

The first network entity may be an AUSF entity, and the second network entity may be a UDM entity, an APRF entity, or an SIDF entity.

The temporary identifier may include an MCC field, an MNC field, and a variable field, the variable field may be generated by a hash function or may be generated as an arbitrary variable, and the variable field may be configured to have a predetermined number of digits.

The temporary identifier may include at least one field among the region identifier for the network entity, the set identifier for the network entity, the network entity identifier, and the variable field. The variable field may be generated by a hash function or may be generated as an arbitrary variable. The network entity may be an AMF entity or a SEAF entity.

The second network entity may generate authentication information (authentication vector) based on the temporary identifier, perform authentication based on the temporary identifier, generate an authentication key based on the temporary identifier and the authentication information, and transmit the generated authentication key to the first network entity.

It should be noted that the above-described configuration views, example views of control/data signal transmission methods, example views of operational procedures, and configuration views are not intended as limiting the scope of the disclosure. In other words, all the components, entities, or operational steps described in connection with the embodiments should not be construed as essential components to practice the disclosure, and the disclosure may be rather implemented with only some of the components without departing from the spirit of the disclosure. The embodiments may be practiced in combination, as necessary. For example, some of the methods proposed herein may be combined to operate the network entity and the UE.

The above-described operations of the base station or terminal may be realized by equipping a memory device retaining their corresponding codes in the base station device or any component of the terminal device. That is, the controller in the eNB or terminal may execute the above-described operations by reading and executing the program codes stored in the memory device by a processor or central processing unit (CPU).

As described herein, various components or modules in the entity, base station or UE may be operated using a hardware circuit, e.g., a complementary metal oxide semi-conductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification of the dis-closure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the pro-grams may be stored in a memory constituted of a combi-nation of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data pro-cessing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product includ-ing an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data pro-cessing devices may provide steps for executing the func-tions described in connection with a block(s) in each flow-chart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

While the disclosure has been illustrated and described with reference to various embodiments of the present dis-closure, those skilled in the art will understand that various changes can be made in form and detail without departing from the spirit and scope of the present disclosure as defined by the appended claims and their equivalents.

What is claimed is:

1. A method performed by a first network entity in a wireless communication system, the method comprising:
   receiving, from a second network entity, an authentication acquisition response message including a subscription permanent identifier (SUPI) of a user equipment (UE);
   generating a temporary identifier for the UE based on the SUPI; and
   transmitting, to a third network entity, an authentication response message including the temporary identifier,
   wherein the temporary identifier includes a random vari-able which is generated as based on the SUPI,
   wherein the first network entity and the second network entity are included in a home public land mobile network (HPLMN), and
   wherein the third network entity is included in a visited public land mobile network (VPLMN).

2. The method of claim 1,
   wherein the temporary identifier includes a mobile coun-try code (MCC) field and a mobile network code (MNC) field,
   wherein the random variable is generated by a Hash function, and
   wherein a number of digits for the random variable is set to a predetermined number of digits.

3. The method of claim 1,
   wherein the temporary identifier includes at least one of a region identifier field for a fourth network entity, a set identifier field for the fourth network entity, an identi-fier field of the fourth network entity, or a variable field,
   wherein the variable field is generated by a Hash function or as a random variable, and
   wherein the fourth network entity includes an access and mobility management function (AMF) entity or a secu-rity anchor function (SEAF) entity.

4. The method of claim 1,
   wherein the first network entity includes an authentication server function (AUSF) entity,
   wherein the second network entity includes a unified data manager (UDM) entity, and
   wherein the third network entity includes a security anchor function (SEAF) entity.

5. The method of claim 1, further comprising:
   generating authentication information based on the tem-porary identifier;
   performing authentication based on the temporary iden-tifier;

generating an authentication key based on the temporary identifier and the authentication information; and transmitting, to the third network entity, the generated authentication key.

6. A method performed by a second network entity in a wireless communication system, the method comprising:

receiving, from a first network entity, an authentication acquisition request message including a subscription concealed identifier (SUCI) of a user equipment (UE);

identifying a subscription permanent identifier (SUPI) by de-concealing the SUCI;

generating a temporary identifier for the UE based on the SUPI, the temporary identifier being configured for generating an authentication key in a third network entity; and transmitting, to the first network entity, an authentication acquisition response message including the temporary identifier, wherein the temporary identifier includes a random variable which is generated based on the SUPI, wherein the first network entity and the second network entity are included in a home public land mobile network (HPLMN), and wherein the third network entity is included in a visited public land mobile network (VPLMN).

7. The method of claim 6, wherein the temporary identifier includes a mobile country code (MCC) field and a mobile network code (MNC) field, wherein the random variable is generated by a Hash function, and wherein a number of digits for the random variable is set to a predetermined number of digits.

8. The method of claim 6, wherein the temporary identifier includes at least one of a region identifier field for a fourth network entity, a set identifier field for the fourth network entity, an identifier field of the fourth network entity, or a variable field, wherein the variable field is generated by a Hash function or as a random variable, and wherein the fourth network entity is an access and mobility management function (AMF) entity or a security anchor function (SEAF) entity.

9. The method of claim 6, wherein the first network entity includes an authentication server function (AUSF) entity, and wherein the second network entity includes a unified data manager (UDM) entity.

10. The method of claim 6, further comprising:

generating authentication information based on the temporary identifier;

performing authentication based on the temporary identifier;

generating an authentication key based on the temporary identifier and the authentication information; and transmitting, to the first network entity, the generated authentication key.

11. A first network entity in a wireless communication system, the first network entity comprising:

a transceiver; and at least one processor coupled to the transceiver and configured to:

receive, from a second network entity, an authentication acquisition response message including a subscription permanent identifier (SUPI) of a user equipment (UE), generate a temporary identifier for the UE based on the SUPI, and transmit, to a third network entity, an authentication response message including the temporary identifier, wherein the temporary identifier includes a random variable which is generated based on the SUPI, wherein the first network entity and the second network entity are included in a home public land mobile network (HPLMN), and wherein the third network entity is included in a visited public land mobile network (VPLMN).

12. The first network entity of claim 11, wherein the temporary identifier includes a mobile country code (MCC) field and a mobile network code (MNC) field, wherein the random variable is generated by a Hash function, and wherein a number of digits for the random variable is set to a predetermined number of digits.

13. The first network entity of claim 11, wherein the temporary identifier includes at least one of a region identifier field for a fourth network entity, a set identifier field for the fourth network entity, or an identifier field of the fourth network entity, wherein the random variable is generated by a Hash function or as a random variable, and wherein the fourth network entity is an access and mobility management function (AMF) entity or a security anchor function (SEAF) entity.

14. The first network entity of claim 11, wherein the first network entity includes an authentication server function (AUSF) entity, wherein the second network entity includes a unified data manager (UDM) entity, and wherein the third network entity includes a security anchor function (SEAF) entity.

15. The first network entity of claim 11, wherein the at least one processor is further configured to:

generate authentication information based on the temporary identifier, perform authentication based on the temporary identifier, generate an authentication key based on the temporary identifier and the authentication information, and transmit, to the third network entity, the generated authentication key.

16. A second network entity in a wireless communication system, comprising:

a transceiver; and at least one processor coupled to the transceiver and configured to:

receive, from a first network entity, an authentication acquisition request message including a subscription concealed identifier (SUCI) of a user equipment (UE), identify a subscription permanent identifier (SUPI) by de-concealing the SUCI, generate a temporary identifier for the UE based on the SUPI, the temporary identifier being configured for generating an authentication key in a third network entity, and transmit, to the first network entity, an authentication acquisition response message including the temporary identifier, wherein the temporary identifier includes a random variable which is generated based on the SUPI, wherein the first network entity and the second network entity are included in a home public land mobile network (HPLMN), and wherein the third network entity is included in a visited public land mobile network (VPLMN).

17. The second network entity of claim 16, wherein the temporary identifier includes a mobile country code (MCC) field and a mobile network code (MNC) field, wherein the random variable is generated by a Hash function, and wherein a number of digits for the random variable is set to a predetermined number of digits.

18. The second network entity of claim 16, wherein the temporary identifier includes at least one of a region identifier field for a fourth network entity, a set identifier field for the fourth network entity, or an identifier field of the fourth network entity, wherein the variable field is generated by a Hash function or as a random variable, and wherein the fourth network entity is an access and mobility management function (AMF) entity or a security anchor function (SEAF) entity.

19. The second network entity of claim 16, wherein the first network entity includes an authentication server function (AUSF) entity, and wherein the second network entity includes a unified data manager (UDM) entity.

20. The second network entity of claim 16, wherein the at least one processor is further configured to:

generate authentication information based on the temporary identifier, perform authentication based on the temporary identifier, generate an authentication key based on the temporary identifier and the authentication information, and transmit, to the first network entity, the generated authentication key.

* * * * *